No. 828,552. PATENTED AUG. 14, 1906.
E. A. JOHNSTON.
HAY LOADER.
APPLICATION FILED DEC. 27, 1904.
3 SHEETS—SHEET 2.
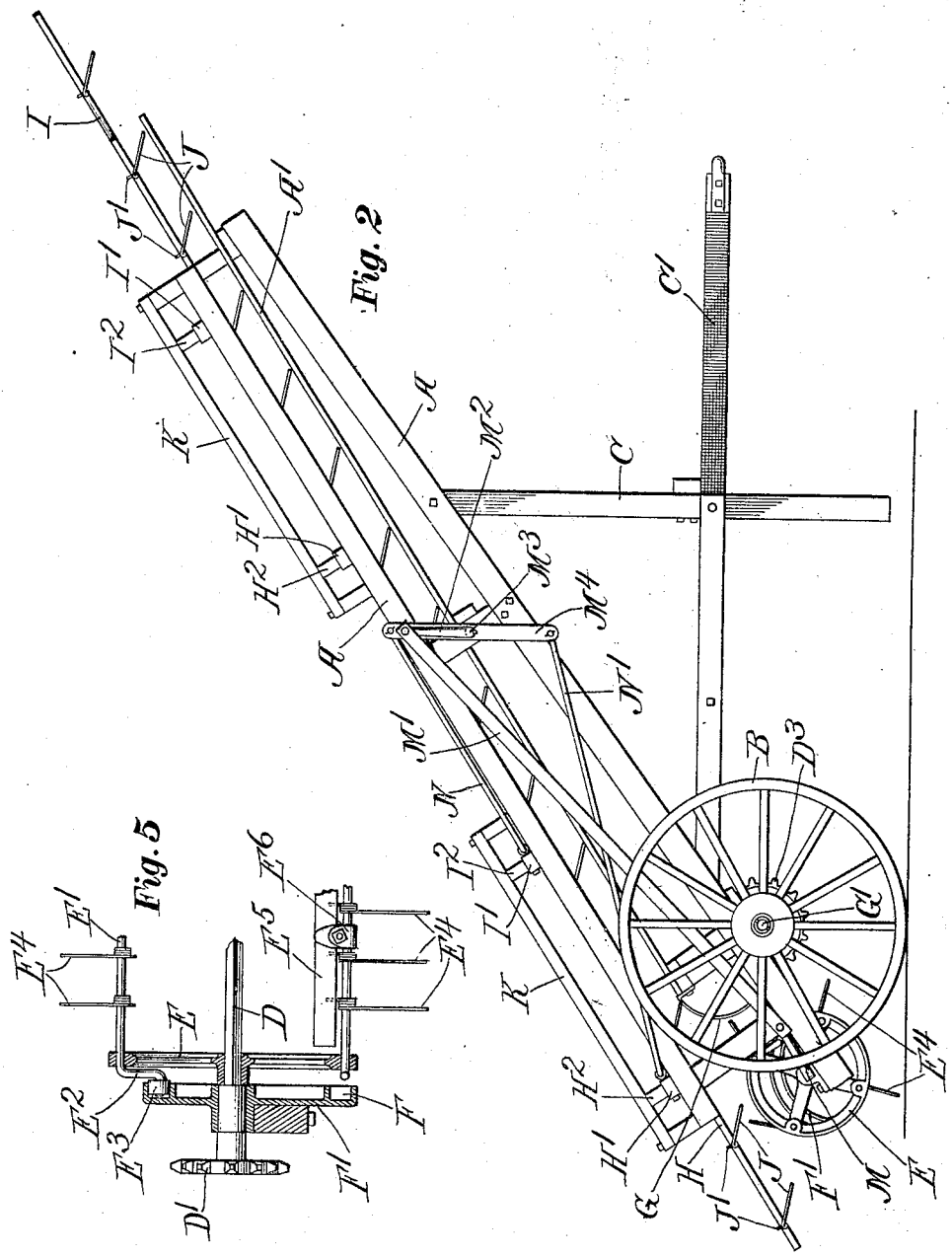

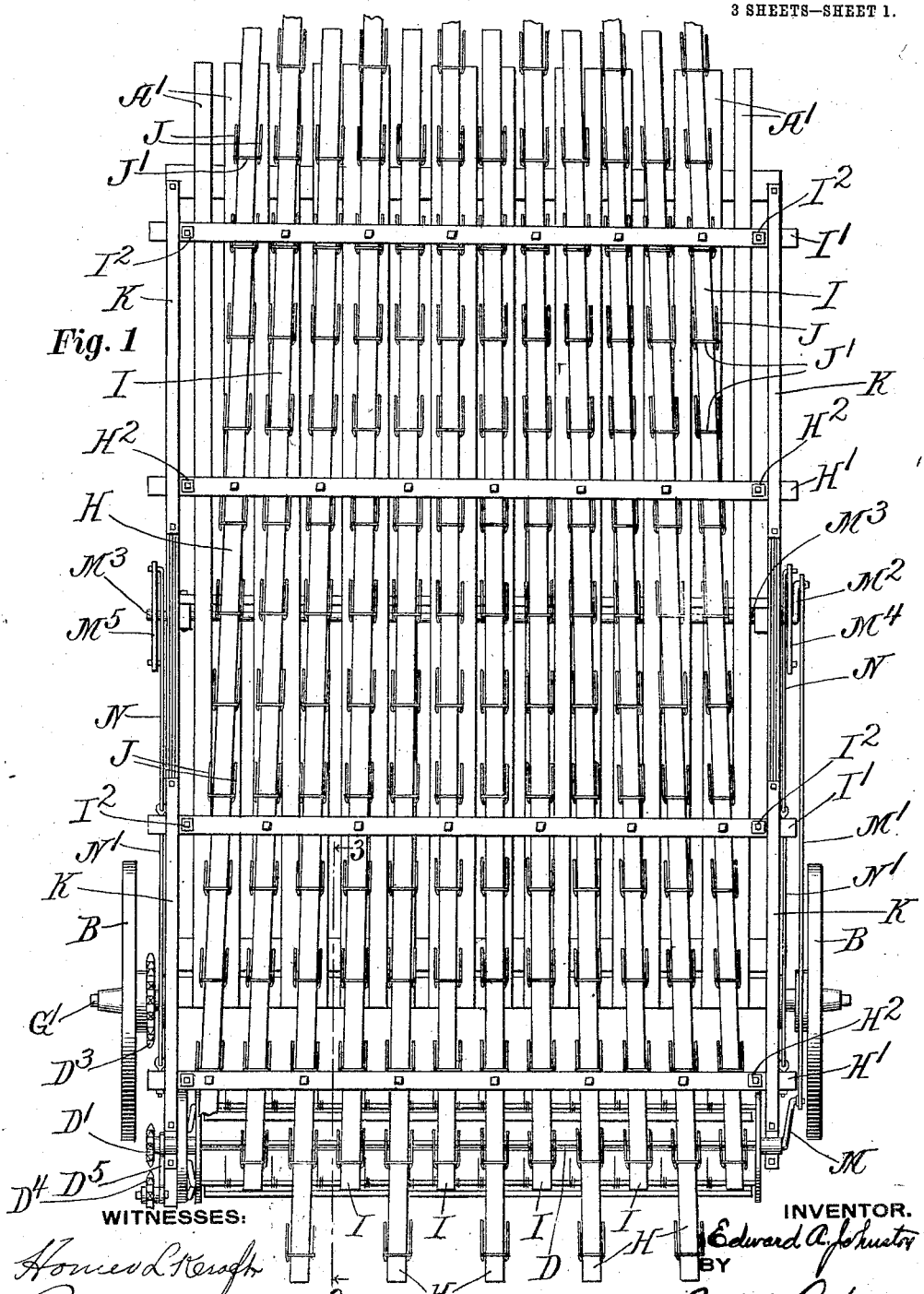

No. 828,552. PATENTED AUG. 14, 1906.
E. A. JOHNSTON.
HAY LOADER.
APPLICATION FILED DEC. 27, 1904.
3 SHEETS—SHEET 3.
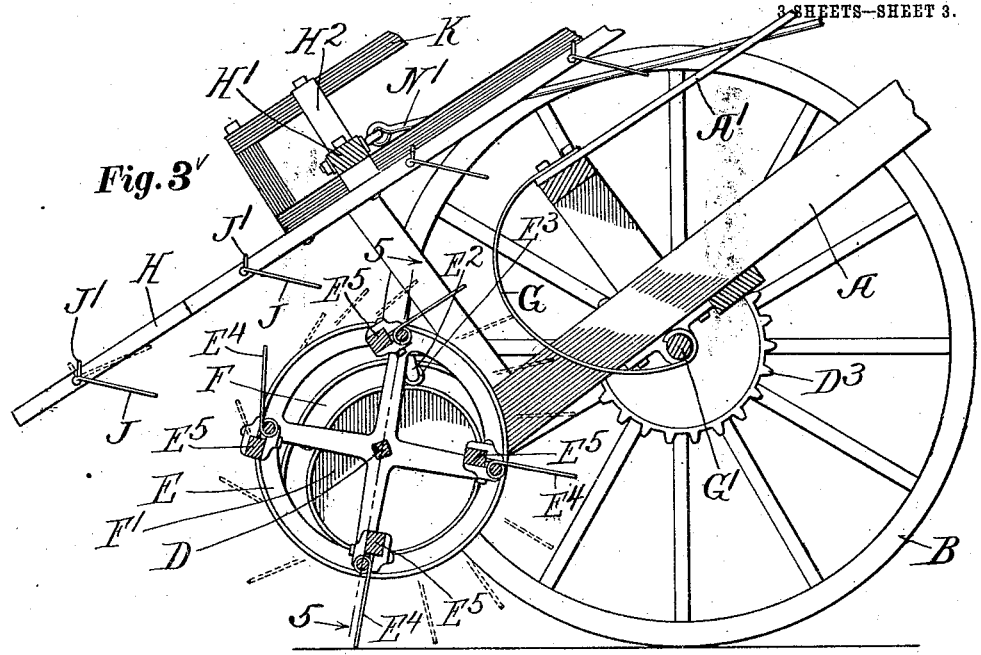
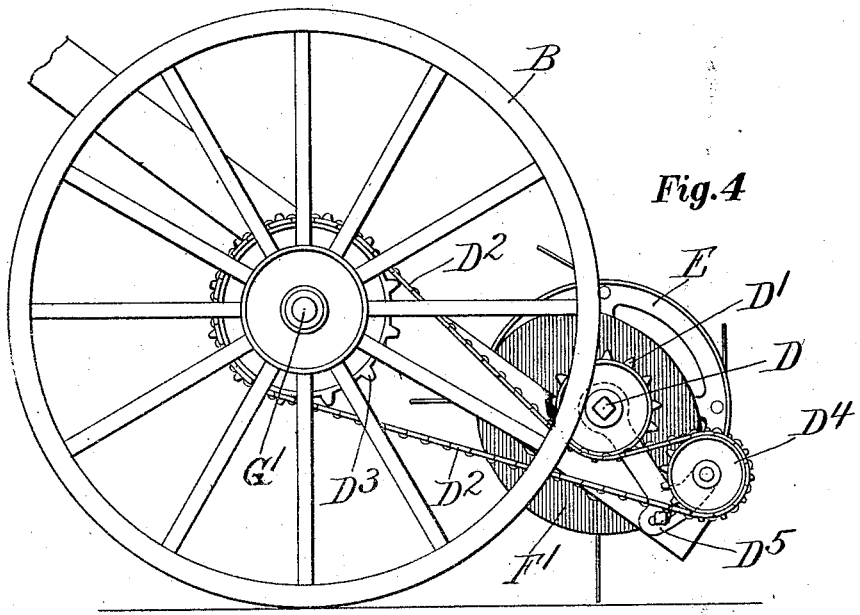
WITNESSES:  INVENTOR.
Edward A. Johnston
BY
Parker & Carter
ATTORNEYS

UNITED STATES PATENT OFFICE.

EDWARD A. JOHNSTON, OF STERLING, ILLINOIS, ASSIGNOR TO THE KEYSTONE COMPANY, OF ROCK FALLS, ILLINOIS, A CORPORATION OF ILLINOIS.

HAY-LOADER.

No. 828,552.  Specification of Letters Patent.  Patented Aug. 14, 1906.

Application filed December 27, 1904. Serial No. 238,375.

*To all whom it may concern:*

Be it known that I, EDWARD A. JOHNSTON, a citizen of the United States, residing at Sterling, in the county of Whiteside and State of Illinois, have invented a certain new and useful Improvement in Hay-Loaders, of which the following is a specification.

Figure 1 is a plan view; Fig. 2, a side elevation; Fig. 3, a sectional side elevation of the lower portions of the machine; Fig. 4, a fragment of the machine, showing the means for giving rotation to the rotary raking devices; and Fig. 5 a fragmentary view of the raking devices.

The object of my invention is to adapt loaders having rotary raking devices to use in raking from the windrow or swath, as may be required, to elevate the hay accumulated by the rotary raking devices and deliver it to a wagon by means which shall operate on the hay to forward it without in any manner acting to draw the hay thus delivered from the rear end of the load as it accumulates on the wagon, as is a common fault with the endless elevating devices sometimes used.

The object is also to provide means whereby a perfect separation may be made between the hay acted upon by the rotary rake and that left remaining in the swath.

To accomplish these objects a rotary raking-drum is employed and supplied with feathering-teeth, which feathering action will enable them to withdraw from the hay operated upon after it has been raised to sufficient height to be engaged by the elevating devices proper, and associated therewith is an elevating device the moving element of which effectually strips the hay from the teeth of the rotary raking device at the instant they are in position to be cleared from the mass elevated by them. The coöperation of the devices is such that the elevating device may be considered to serve as a doffer to the teeth of the rotary rake.

Another of the principal objects is accomplished by placing the raking-drum sufficiently far in rear of the axis of the supporting-wheels that hay trod upon by the latter in passing over the ground is released before the teeth of the raking-drum engage the swath.

I am aware that rotary rakes and endless tooth conveyers have been used; but the rotary rakes are generally mounted concentrically relative to the main supporting-wheels or immediately thereunder, the result being that the said wheels have necessarily been placed a considerable distance laterally from the ends of the rotary or other raking devices so placed in order that the hay engaged by the rake could not at the same time be held by the main supporting-wheel also resting upon the swath so near it.

Another object of my invention is to rake the hay by a forward movement of the rotary rake, force it fully into a narrow throat before the beginning of the retractile action of the rakes, and following this move it bodily upward and deliver it to the coöperating elevating mechanism.

Like letters refer to like parts throughout the several figures.

My present device is particularly adapted for loading hay, grain, or any similar material upon a wagon or other vehicle and is adapted to be attached to such vehicle, so as to be moved along with it.

As herein shown, the device is provided with a carrier-frame A, mounted upon carrying-wheels B. Attached to the frame is some suitable supporting device C, to which is connected the pole or tongue C', by means of which the device is attached to the vehicle. The frame A is provided with a guideway, along which the material travels and, as herein shown, consists of a series of separated strips or pieces A'.

Mounted directly upon the frame A some distance in rear of the supporting-wheels is a rotary rake, by means of which the material is delivered through a throat to the carrier mechanism, which elevates and transfers it to the vehicle. This raking device is provided with a shaft D, provided with a sprocket-wheel D', which is engaged by the chain D², passing around a driving-sprocket-wheel D³, rotated by the driving-wheels. The chain D² passes over an idler D⁴, attached to an adjustable arm D⁵, pivoted, preferably, coincident with the shaft D.

Near each end of the shaft D is a spider or disk E, connected so as to rotate with the shaft. As herein shown, the shaft is non-circular at these points and passes through a non-circular opening in these disks. A series of rock-shafts E' are associated with these disks and pass therethrough, so as to be supported thereby. These rock-shafts at one end are provided with cranks E², which are bent, so as to project into a groove F in a cam-disk F', rigidly attached to the frame of the machine. As herein shown, the shaft E passes through this cam-disk, the hub of the disk acting as a bearing therefor. The ends of the cranks E² are preferably provided with rollers E³. (See Fig. 5.) Connected with the rock-shafts E' are a series of teeth E⁴, which may be of any desired construction and, as herein shown, are wrapped about the shafts, one end of each tooth projecting outwardly, so as to engage the material, and the other end engaging a holding-piece E⁵. These holding-pieces are rigidly clamped to the rock-shafts by clamps E⁶, so that the teeth are fixed upon the shafts. When the shaft D is rotated, it carries with it the disks E and rock-shafts E'. Such rock-shafts, because of the engagement of the cranks with the cam-slots of the cam F', are rocked during this rotation, so as to tilt the teeth. The teeth are made to project straight outwardly when picking up the material, and these rock-shafts are rocked, so as to tilt the teeth at the point where they release the material, so as to facilitate their withdrawal therefrom by feeding action, as shown in dotted lines in Fig. 3. Connected with the pieces A', forming the floor of the guideway, are a series of engaging members G—in this instance having their other ends supported by the axle G'. These engaging members are preferably elastic and form a contracted throatway, that is curved rearwardly and downwardly from the carrier-frame and then forward toward the axle of the carrying-wheels, through which the material is delivered by the rotary rake. When the material is fed through this throatway, it is engaged by a series of carrier-bars H and I, which doff the withdrawing-teeth of the rotary rakes. These carrier-bars are adapted to be reciprocated and are divided into sets, one set moving in one direction, while the other is moving in the opposite direction. Said bars are provided with movable teeth J, which may be arranged in any desired manner. As herein shown, these teeth are pivotally connected to the bars and are each provided with a limiting device J', which projects above the bars and limits the movement of the teeth with relation to the bars. When the bars are being moved upward, the teeth will be in the position shown in full lines in Fig. 3, and when they are moved backward they slide over the material and move up out of the way, as shown in dotted lines in Fig. 3, so as not to draw the material backward. When again started in their upward movement, the teeth take their proper positions and carry the material up with them. As herein shown, the bars H are connected to the cross-pieces H', while the bars I are connected to the cross-pieces I'. These bars slide upon the frame A and are preferably provided with limiting devices K, which limit their outward movement due to the pressure of the material beneath them. The cross-pieces I' and H' are preferably provided with engaging parts I² and H², which prevent their lateral displacement, such parts engaging the limiting devices K, so as to confine the carrier-bars in their proper positions. Any desired means of operating these carrier-bars may be used. As herein shown, the shaft D is provided with a crank M. This crank is connected by a connecting-piece or rod M' with a crank M² on a shaft M³. The shaft M³ is provided with rocking beams or bars M⁴ M⁵, which are rocked each time the shaft D is rotated. It is of course evident that the connecting-rod M might be connected directly to the rocking bar M², if desired. Attached to one end of the rocking bars are the connecting rods or pieces N, which are fastened to the cross-piece I'. At the other end of the rocking bars are the connecting-rods N', fastened to the cross-piece H'. It will thus be seen that when the shaft M³ is rocked in one direction the carrier-bars I will be moved up and the carrier-bars H down, while when said shaft is rocked in the other direction the movement of the carrier-bars will be reversed. It will further be seen that by this construction these carrier-bars are reciprocated and that their movement is practically a movement of translation—that is to say, they are not lifted up and down, as would be the case if they were connected with cranks or eccentrics or the like, but are moved back and forth substantially in the same plane. It will further be seen that these carrier-bars project over the rotary rake, so as to take the material directly therefrom.

In the specification and claims I have used the term "hay" as applied to the loader; but I use this simply as a matter of convenience, intending it to cover any and all other material in connection with which it may be desired to use this device.

The use and operation of my invention are as follows: When the device is to be used, it is attached to the back of the vehicle into which the material is to be loaded. As the device moves along the shaft D and the disk E are rotated, and the teeth E⁴ engage the material and lift it up through the throatway, so that it may be engaged by the carrier-bars. While the device is operating, the carrier-bars are reciprocating, one set moving in one direction and the other set moving in the opposite direction, so that at all times the doffing action may assist in cleaning the teeth E. As one set of carrier-bars moves up the teeth engage the material and move it up along the floor of the guideway. When it is moved up a certain distance, it is engaged by another set of bars, which move it farther along, the first set of bars being retracted and the teeth moving up against the bars so as to permit the free retraction thereof. This process is continued and the material thus moved up to the point of discharge and then discharged into the vehicle. In this construction the reciprocating carrier-bars project over the throatway between the feeding device and the frame and carry the hay from said throatway onto the guideway. It will further be noted that the bottom of the guideway is located above the feeding device. It will further be noted that the carrier-bars are confined within fixed limits and that they may be automatically moved away from the floor of the guideway in response to the pressure of the material. If, for example, the material is taken from the swath, it will pass along the guideway in a comparatively thin layer; but if it is taken from the windrow, this layer will be much thicker and the carrier-bars will automatically move away from the floor to adjust themselves to this variation in the quantity of material. To facilitate this action, the reciprocating bars are connected with the rocking-bar or other form of driving mechanism by flexible connections. The fact that the teeth of the feeding device are, as it were, flexible and tilt at the point of withdrawal makes it possible for the teeth of the carrier-bars, which are rigid during the forwarding movement of such bar, to effectively coöperate with the teeth of the feeding device in disengaging the material therefrom. As will be noted, the feeding device rotates in a direction opposite to the feeding movement of the carrier-bars. The carrier-bars project beyond the frame at both ends when in their extreme positions. The swath or windrow of hay advanced upon and engaged by the rotary rake is lifted and by its action and that of the elevating device is moved upward and forward. It may be said to turn around the engaging members G and start in a forward direction up the incline. The engaging members G, curved as they are, form one wall of the throat widely open below and curved in the direction, the mass is forced to travel by the elevating device. The combination of elements forming the raking and conveying device is also adaptable to that class of side-delivery hay-rakes in which the hay is lifted and afterward moved to position on an endless conveyer, which delivers it in the form of a swath at the side of the machine.

I claim—

1. A hay-loader comprising, in combination, an elevator and carrier-frame, carrying-wheels upon which said frame is mounted, a toothed raking-cylinder mounted upon said frame and having its axis in rear of the axis of said carrying-wheels, means for rotating said cylinder in a direction opposite to that of said carrying-wheels, elevating and carrying mechanism mounted upon said frame and having its lower end operative in rear of and above said raking-cylinder and adapted to doff the hay therefrom.

2. A hay-loader comprising, in combination, an elevator and carrier-frame, carrying-wheels upon which said frame is mounted, a toothed raking-cylinder mounted upon said frame and having its axis in rear of the axis of said carrying-wheels, and means for rotating said cylinder in a direction opposite to that of said carrying-wheels, elevating and carrying mechanism mounted upon said frame, comprising reciprocating toothed members having their lower ends operative in rear of and above said raking-cylinder and adapted to doff the hay therefrom.

3. A hay-loader comprising, in combination, an elevator and carrier-frame, carrying-wheels upon which said frame is mounted, a toothed raking-cylinder mounted upon said frame in rear of the axis of said carrying-wheels, means for rotating said cylinder in a direction opposite to that of said carrying-wheels, an upwardly-curved throat in rear of the axis of the carrying-wheels and in front of said raking-cylinder, elevating and carrying mechanism mounted upon said frame and having its lower end operative in rear of and above said throat and raking-cylinder.

4. A hay-loader comprising, in combination, an elevator and carrier-frame, carrying-wheels upon which said frame is mounted, a toothed raking-cylinder mounted upon said frame in rear of the axis of said carrying-wheels, means for rotating said cylinder in a direction opposite to that of said carrying-wheels, an upwardly-curved throat in rear of the axis of said carrying-wheels and in front of said raking-cylinder, said throat having a yielding wall, elevating and carrying mechanism mounted upon said frame and having its lower end operative in rear of and above said throat and raking-cylinder.

5. A hay-loader comprising, in combination, an elevator and carrier-frame, an axle having said frame mounted thereon, carrying-wheels mounted upon said axle, a toothed raking-cylinder mounted upon said frame in rear of said axle, means for rotating said cylinder in a direction opposite to that of said carrying-wheels, rearwardly-curved bars having their lower ends connected with said axle and their upper ends secured to the carrier-frame and forming a curved throat between said raking-cylinder and said axle, elevating and carrying mechanism mounted upon said frame and having its lower end operative in rear of and above said throat and raking-cylinder.

6. A hay-loader comprising, in combination, an elevator and carrier-frame, an axle having said frame mounted thereon, carrying-wheels mounted upon said axle, a toothed raking-cylinder mounted upon said frame in rear of said axle, means for rotating said cylinder in a direction opposite to that of said carrying-wheels, flexible bars having their upper ends secured to the carrier-frame and their body portions curved rearwardly and downwardly in front of said raking-cylinder and then forward toward said axle, forming a yielding curved throat between said raking-cylinder and axle, elevating and carrying mechanism mounted upon said frame and having its lower end operative in rear of and above said throat and raking-cylinder.

7. A hay-loader comprising, in combination, an elevator and carrier-frame, an axle having said frame mounted thereon, carrying-wheels mounted upon said axle, a toothed raking-cylinder mounted upon said frame in rear of said axle, means for rotating said cylinder in a direction opposite to that of said carrying-wheels, flexible bars having their upper ends secured to the carrier-frame and their body portions curved rearwardly and downwardly in front of said raking-cylinder, and then forward and connected with said axle, forming a yielding curved throat between said raking-cylinder and axle, elevating and carrying mechanism mounted upon said frame and having its lower end operative in rear of and above said throat and raking-cylinder.

8. A hay-loader comprising, in combination, an elevator and carrier-frame, carrying-wheels upon which said frame is mounted, a toothed raking-cylinder having an axle mounted upon said frame in rear of the axis of said carrying-wheels, said axle provided with a crank portion, a reciprocating carrier mounted upon said frame, means for transmitting motion to said carrier comprising a pitman connecting said carrier to the crank portion of the axle of said raking-cylinder.

9. A hay-loader comprising, in combination, an elevator and carrier-frame, carrying-wheels upon which said frame is mounted, a toothed raking-cylinder having an axle mounted upon said frame in rear of the axis of said carrying-wheels, a reciprocating carrier mounted upon said frame, means for transmitting motion to said carrier, comprising a rock-shaft mounted upon said carrier-frame and having oppositely-disposed lever-arms secured thereto, a connection between said lever-arms and said carriers, a crank-arm secured to said rock-shaft, a crank-arm secured to the axle of said raking-cylinder, and a pitman connection between said crank-arms.

EDWARD A. JOHNSTON.

Witnesses:
E. R. THOMPSON,
T. B. PRERICHS.